United States Patent
Cheng et al.

(10) Patent No.: US 6,755,343 B1
(45) Date of Patent: Jun. 29, 2004

(54) ELECTRONIC CARD CAPABLE OF CHANGING COMMUNICATION FUNCTIONALITY OF A COUPLED ELECTRONIC DEVICE

(75) Inventors: Shih Chieh Cheng, Hsinchu (TW); Jui Chung Chen, Kaohsiung Hsien (TW); Sidney Young, Hsin-Chu (TW)

(73) Assignees: C-One Technology Corporation, Hsin Chu (TW); Pretec Electronics Corporation, Fremont, CA (US)

( * ) Notice: Subject to any disclaimer, the term of this patent is extended or adjusted under 35 U.S.C. 154(b) by 0 days.

(21) Appl. No.: 10/382,912

(22) Filed: Mar. 7, 2003

(30) Foreign Application Priority Data

Dec. 18, 2002 (TW) ..................................... 91220576 U

(51) Int. Cl.[7] .............................................. G06F 17/60
(52) U.S. Cl. ....................... 235/380; 235/492; 235/375; 235/472
(58) Field of Search ................................ 710/102, 301; 235/380, 492, 375, 472

(56) References Cited

U.S. PATENT DOCUMENTS

| | | | | |
|---|---|---|---|---|
| 5,747,786 A | * | 5/1998 | Cargin et al. | 235/462.46 |
| 6,012,634 A | * | 1/2000 | Brogan et al. | 235/380 |
| 6,199,128 B1 | * | 3/2001 | Sarat | 710/301 |
| 6,439,464 B1 | * | 8/2002 | Fruhauf et al. | 235/492 |
| 6,557,754 B2 | * | 5/2003 | Gray et al. | 235/375 |
| 6,581,122 B1 | * | 6/2003 | Sarat | 710/301 |

* cited by examiner

*Primary Examiner*—Daniel A Hess
(74) *Attorney, Agent, or Firm*—Bacon & Thomas, PLLC

(57) ABSTRACT

An electronic card capable of changing communication functionality of a coupled electronic device is disclosed. A removable interface has at least a card detection pin which is set at a first state or a second state based on the coupled electronic device. A functional module provides a communication functionality via an access bus or a specific application bus based on whether the card detection pin is at the first state or the second state. A bridge is provided for bridging and converting signals of the interface bus on the removable interface into signals of the access bus or the specific application bus, or vice versa. A multiplexer device selects signals of the access bus or signals of the specific application bus based on whether the card detection pin is at the first state or the second state for being switched to the interface bus.

11 Claims, 3 Drawing Sheets

ELECTRONIC CARD CAPABLE OF CHANGING COMMUNICATION FUNCTIONALITY OF A COUPLED ELECTRONIC DEVICE

BACKGROUND OF THE INVENTION

1. Field of the Invention

The present invention relates to an electronic card and, more particularly, to an electronic card capable of changing communication functionality of a coupled electronic device.

2. Description of Related Art

Electronics technology has known a rapid, spectacular development leading to an increasing use of communication products such as telephones, fax machines, cellular phones, etc. Recently, there is a trend of developing small communication products which are connectable to computers for adding communication functionalities thereto. Currently, there is an electronic card having communication capability (e.g., modem card or GSM/GPRS-Global System for Mobile/General Packet Radio Service-card available). The electronic card can provide a dial-up capability to a coupled PDA or enable the coupled PDA to operate as a cellular phone. As such, a portable device such as PDA coupled to the electronic card is able to possess additional communication features.

It is understood that the telephone, fax machine, or cellular phone can operate independently. But the modem card or GSM/GPRS card has to couple to an independently operable device such as PDA or notebook computer prior to normally operating because it is a peripheral based device. However, the electronic card, as stated above, already has a communication capability. Hence, a subject of adding more communication functions to the electronic card becomes important in consideration that the hardware resources can be utilized completely.

SUMMARY OF THE INVENTION

The object of the present invention is to provide an electronic card capable of changing communication functionality of a coupled electronic device so as to fully utilize the communication capability of the electronic card thereby achieving the purpose of using minimum hardware resource to provide maximum communication functionality.

To achieve the above and other objects, the electronic card in accordance with the present invention includes: a removable interface for being inserted into an electronic device and coupling to an interface bus, the removable interface having at least a card detection pin which is set at a first state or a second state based on the coupled electronic device; a functional module for providing a communication functionality via an access bus or a specific application bus based on whether the card detection pin is at the first state or the second state; a bridge for bridging and converting signals of the interface bus on the removable interface into signals of the access bus or the specific application bus, or bridging and converting the signals of the access bus or the specific application bus into the interface bus signals on the removable interface; and a multiplexer device for selecting signals of the access bus or signals of the specific application bus based on whether the card detection pin is at the first state or the second state for being switched to the interface bus.

Other objects, advantages, and novel features of the invention will become more apparent from the detailed description when taken in conjunction with the accompanying drawings.

DETAILED DESCRIPTION OF THE PREFERRED EMBODIMENT

Figure 1:
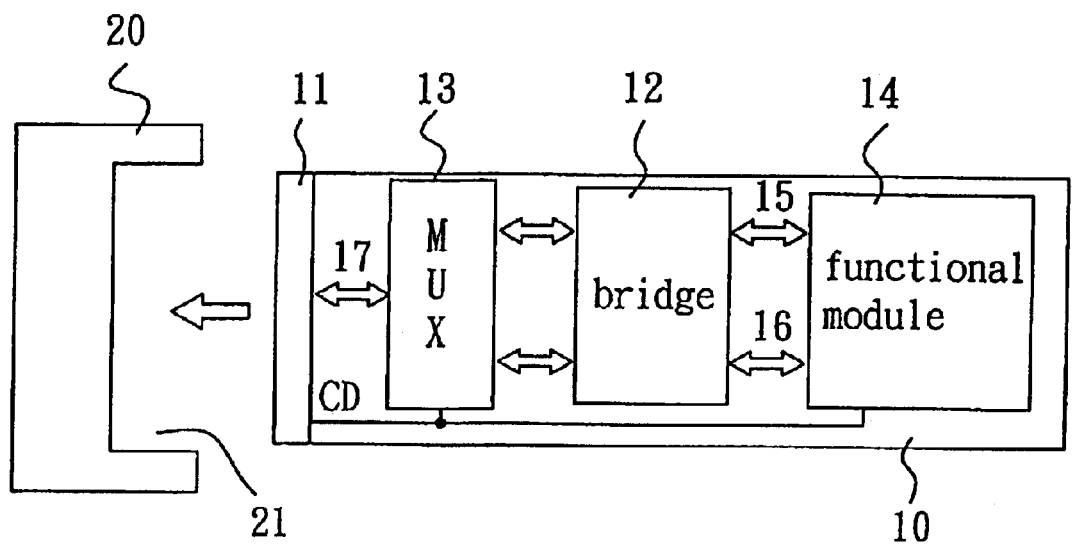
FIG. 1 schematically illustrates an electronic card according to the invention and its components where the electronic card is being coupled to an electronic device.

With reference to FIG. 1, there is shown an electronic card 10 constructed in accordance with the invention comprising a removable interface 11, a bridge 12, a multiplexer device 13, and a functional module 14. The removable interface 11 can be inserted into a jack 21 of an electronic device 20. The bridge 12 is coupled to the functional module 14 via an access bus 15 or a specific application bus 16 so as to bridge and convert signals of the interface bus 17 of the removable interface 11 into signals of the access bus 15 or specific application bus 16, or to bridge and convert signals of the access bus 15 or specific application bus 16 into signals of the interface bus 17 of the removable interface 11.

In the removable interface 11, there is provided a card detection pin, such as the Card Detection (CD) pin defined by CF (Compact Flash). As such, the card detection pin can be set at a first or second state based on the electronic device 20 coupled to the removable interface 11. For example, the card detection pin of the removable interface 11 is at a low level if the electronic device 20 is an independently operable device such as computer. Otherwise, the card detection pin of the removable interface 11 is at a high level.

The functional module 14 can provide at least one communication functionality, which is supplied via the access bus 15 or the specific application bus 16 based on whether the card detection pin is at the first state or the second state.

Figure 2:
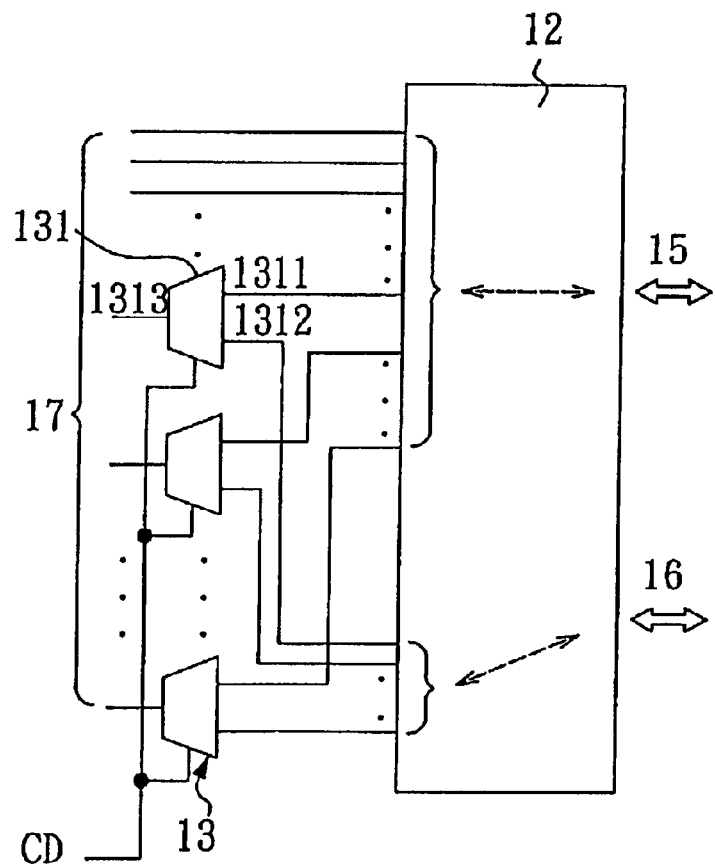
FIG. 2 is a schematic circuit diagram showing the multiplexer device and bridge of the electronic card.

The multiplexer device 13 can switch signal communication from the interface bus 17 to the access bus 15 or the specific application bus 16. In detail, with reference to FIG. 2, the multiplexer device 13 comprises a plurality of multiplexers 131, each including two selection terminals 1311, 1312 respectively coupled to the access bus 15 and the specific application bus 16 via the bridge 12, and a connection terminal 1313 coupled to the interface bus 17. As shown, all signals from the specific application bus 16 and a portion of signals from the access bus 15 are coupled to the multiplexer device 13. Each multiplexer 131 is controlled by the card detection pin. For example, the multiplexer device 13 switches signals of the access bus 15 to the interface bus 17 when the card detection pin is at the first state. As a result, the functional module 14 can provide a specific communication functionality through the access bus 15. Alternatively, the multiplexer device 13 switches signals of the specific application bus 16 and a portion of the access bus 15 to the interface bus 17 when the card detection pin is at the second state. As a result, the functional module 14 can provide another specific communication functionality via the specific application bus 16. Accordingly, it is able to achieve the purpose of changing communication functionality of an electronic device.

Figure 3A:
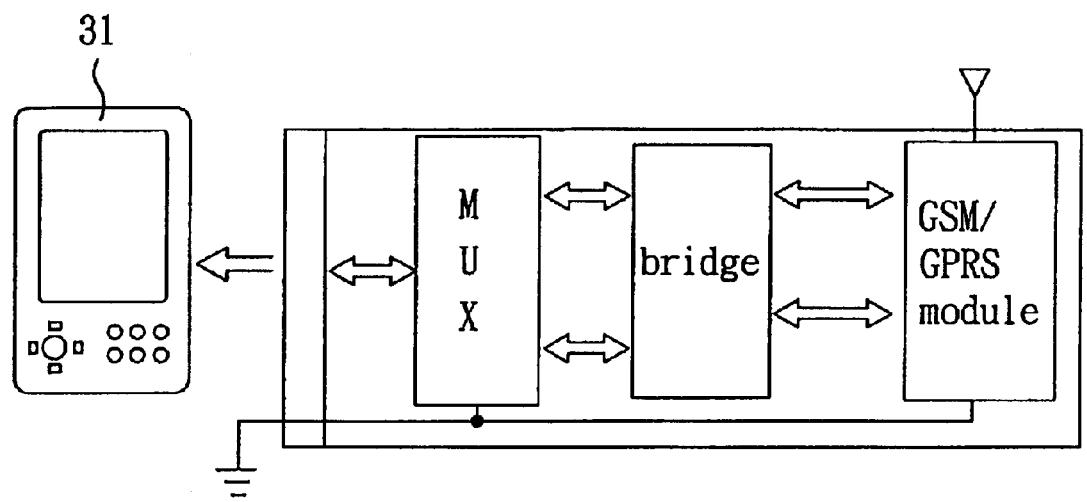
FIG. 3A schematically illustrates that the electronic card is served as a wireless card.
Figure 3B:
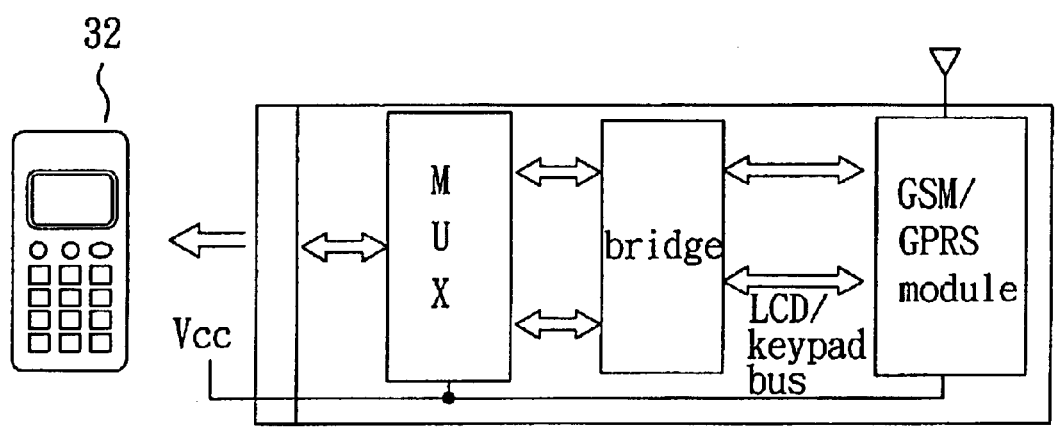
FIG. 3B schematically illustrates that the electronic card changes an electronic device to a cellular phone.

With reference to FIGS. 3A and 3B, an example of the invention will now be described in detail below wherein the functional module 14 of the electronic card 10 is implemented as a GSM/GPRS module, which can provide wireless communication and Internet access functionalities. In FIG. 3A, once the electronic card 10 is coupled to an independently operable computer device such as PDA 31 the card detection pin will be at the first state. As a result, the GSM/GPRS module can provide wireless communication and Internet access functionalities to the PDA 31 via the access bus 15. In other words, the electronic card 10 is served as a GSM/GPRS card. In FIG. 3B, once the electronic card 10 is coupled to a LCD/keypad device 32, the card detection pin will be at the second state. As a result, the GSM/GPRS module can provide wireless communication and Internet access functionalities to the LCD/keypad device 32 via the specific application bus 16 (which is a LCD/keypad bus). Therefore, the LCD/keypad device 32 inserted with the electronic card 10 is varied and served as a cellular phone.

Figure 4A:
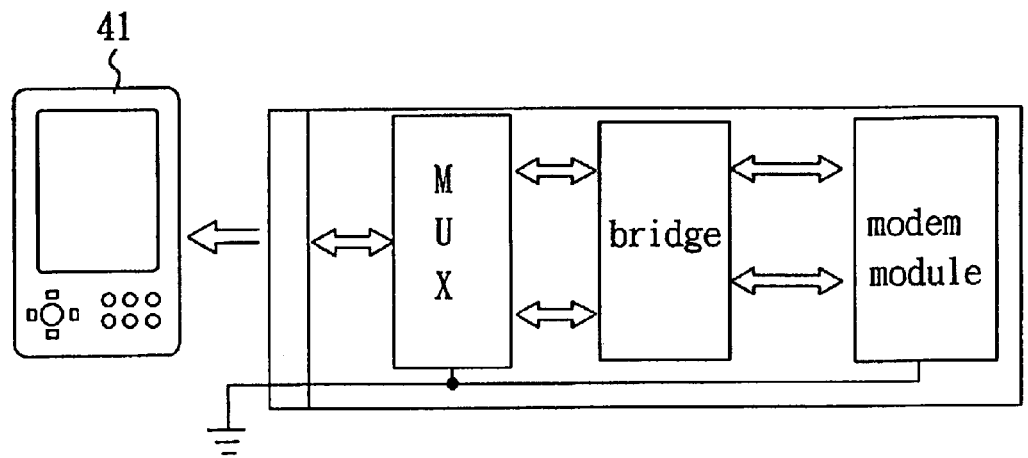
FIG. 4A schematically illustrates that the electronic card is served as a modem card.
Figure 4B:
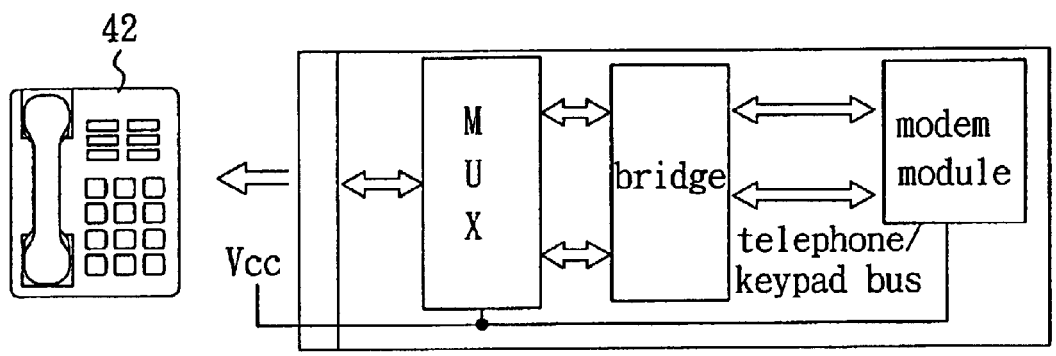
FIG. 4B schematically illustrates that the electronic card changes an electronic device to a telephone set.
Figure 4C:
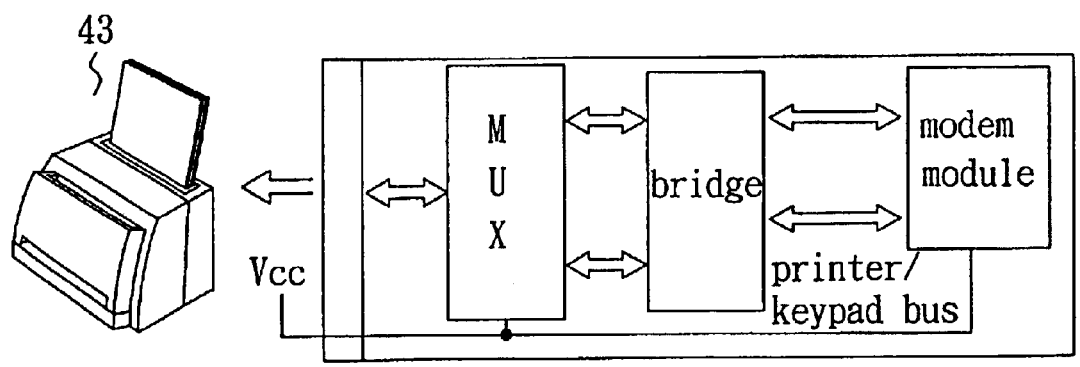
FIG. 4C schematically illustrates that the electronic card changes an electronic device to a fax machine.

With reference to FIGS. 4A, 4B, and 4C, another example of the invention will now be described in detail below wherein the functional module 14 of the electronic card 10 is implemented as a modem module, which can provide a dial-up functionality. In FIG. 4A, once the electronic card 10 is coupled to an independently operable computer device such as PDA 41, the card detection pin will be at the first state. As a result, the modem module can provide a dial-up functionality to the PDA 41 via the access bus 15. In other words, the electronic card 10 is served as a modem card. In FIG. 4B, once the electronic card 10 is coupled to a telephone/keypad device 42, the card detection pin will be at the second state. As a result, the modem module can provide a dial-up functionality to the telephone/keypad device 42 via the specific application bus 16 (which is a telephone/keypad bus). Accordingly, the telephone/keypad device 42 inserted with the electronic card 10 is varied and served as a telephone set. In FIG. 4C, once the electronic card 10 is coupled to a printer 43, the card detection pin will be at the second state. As a result, the modem module can provide a dial-up functionality to the printer 43 via the specific application bus 16 (which is a printer/keypad bus). Accordingly, the printer 43 inserted with the electronic card 10 is varied and served as a fax machine.

In view of the forgoing, it is known that the electronic card capable of changing communication functionality in accordance with the present invention can be automatically varied and served as different communication apparatuses in response to the electronic device in which the electronic card is inserted. Therefore, the communication capability of the electronic card can be fully utilized, thereby achieving the purpose of using minimum hardware resource to provide maximum communication functionality.

Although the present invention has been explained in relation to its preferred embodiment, it is to be understood that many other possible modifications and variations can be made without departing from the spirit and scope of the invention as hereinafter claimed.

What is claimed is:

1. An electronic card capable of changing communication functionality of a coupled electronic device comprising:
   a removable interface for being inserted into an electronic device and coupling to an interface bus, the removable interface having at least a card detection pin which is set at a first state or a second state based on the coupled electronic device;
   a functional module for providing a communication functionality via an access bus or a specific application bus based on whether the card detection pin is at the first state or the second state;
   a bridge for bridging and converting signals of the interface bus on the removable interface into signals of the access bus or the specific application bus, or bridging and converting the signals of the access bus or the specific application bus into the interface bus signals on the removable interface; and
   a multiplexer device for selecting signals of the access bus or signals of the specific application bus based on whether the card detection pin is at the first state or the second state for being switched to the interface bus.

2. The electronic card capable of changing communication functionality of a coupled electronic device as claimed in claim 1, wherein the multiplexer device switches the signals of the access bus to the interface bus when the card detection pin is at the first state, and switches the signals of the specific application bus and a portion of the signals of the access bus to the interface bus when the card detection pin is at the second state.

3. The electronic card capable of changing communication functionality of a coupled electronic device as claimed in claim 2, wherein the functional module is a GSM/GPRS module, so that, when the electronic device is an independently operable computer device, the card detection pin is at the first state to make the GSM/GPRS module provide wireless communication and Internet access functionalities via the access bus.

4. The electronic card capable of changing communication functionality of a coupled electronic device as claimed in claim 3, wherein, when the electronic device is an LCD/keypad device, the card detection pin is at the second state to make the GSM/GPRS module provide wireless communication and Internet access functionalities via the specific application bus, thereby changing the LCD/keypad device into a cellular phone.

5. The electronic card capable of changing communication functionality of a coupled electronic device as claimed in claim 4, wherein the specific application bus is an LCD/keypad bus.

6. The electronic card capable of changing communication functionality of a coupled electronic device as claimed in claim 1, wherein the functional module is a modem module so that, when the electronic device is an independently operable computer device, the card detection pin is at the first state to make the modem module provide a dial-up functionality via the access bus.

7. The electronic card capable of changing communication functionality of a coupled electronic device as claimed in claim 6, wherein, when the electronic device is a telephone/keypad device, the card detection pin is at the second state to make the modem module provide a dial-up functionality via the specific application bus, thereby changing the telephone/keypad device into a telephone set.

8. The electronic card capable of changing communication functionality of a coupled electronic device as claimed in claim 7, wherein the specific application bus is a telephone/keypad bus.

9. The electronic card capable of changing communication functionality of a coupled electronic device as claimed in claim 6, wherein, when the electronic device is a printer, the card detection pin is at the second state to make the modem module provide a dial-up functionality via the specific application bus, thereby changing the printer into a fax machine.

10. The electronic card capable of changing communication functionality of a coupled electronic device as claimed in claim 9, wherein the specific application bus is a printer/keypad bus.

11. The electronic card capable of changing communication functionality of a coupled electronic device as claimed in claim 1, wherein the removable interface is a CF interface.

* * * * *